United States Patent
Kallman et al.

(10) Patent No.: US 7,244,106 B2
(45) Date of Patent: Jul. 17, 2007

(54) PROCESS AND DEVICE FOR FLOW CONTROL OF AN ELECTRICAL MOTOR FAN

(75) Inventors: Bengt Kallman, Leksand (SE); Hans-Olof Frojd, Gavle (SE)

(73) Assignee: 3M Innovative Properties Company, St Paul, MN (US)

( * ) Notice: Subject to any disclaimer, the term of this patent is extended or adjusted under 35 U.S.C. 154(b) by 205 days.

(21) Appl. No.: 10/380,773

(22) PCT Filed: Sep. 18, 2001

(86) PCT No.: PCT/SE01/01987

§ 371 (c)(1), (2), (4) Date: Aug. 11, 2003

(87) PCT Pub. No.: WO02/23298

PCT Pub. Date: Mar. 21, 2002

(65) Prior Publication Data

US 2004/0101412 A1    May 27, 2004

(30) Foreign Application Priority Data

Sep. 18, 2000  (SE) .................................... 0003339

(51) Int. Cl.
*F04B 49/06* (2006.01)
(52) U.S. Cl. ......................... 417/44.1; 417/45
(58) Field of Classification Search .................. 417/43, 417/44.1, 45, 42, 423.9
See application file for complete search history.

(56) References Cited

U.S. PATENT DOCUMENTS

| | | | | |
|---|---|---|---|---|
| 4,659,976 A | * | 4/1987 | Johanson ...................... 388/816 |
| 4,978,896 A | * | 12/1990 | Shah ........................... 318/254 |
| 5,019,757 A | * | 5/1991 | Beifus ......................... 318/254 |
| 5,447,414 A | * | 9/1995 | Nordby et al. ................. 417/20 |
| 5,671,730 A | | 9/1997 | Ollila |
| 5,703,459 A | * | 12/1997 | Yasohara et al. ............ 318/808 |
| 5,736,823 A | * | 4/1998 | Nordby et al. .............. 318/432 |
| 5,917,296 A | * | 6/1999 | Frey et al. .................. 318/268 |
| 6,023,144 A | * | 2/2000 | Imai et al. .................. 318/641 |
| 6,462,494 B1 | * | 10/2002 | Schone et al. .............. 318/433 |

(Continued)

FOREIGN PATENT DOCUMENTS

EP    0 518 538    12/1992

(Continued)

Primary Examiner—William H. Rodriguez
(74) Attorney, Agent, or Firm—William Bauer; Karl G. Hanson

(57) ABSTRACT

A method and configuration from maintaining a constant of air to a protective helmet (4) from a fan (3) in a battery powered fresh air unit. The fan (3) is a radial fan with a filter (5) positioned on the suction side of the fan and is operated by a brushless continuous current motor (2). With the aid of signals from position sensors (30) in the motor (2), a control unit (12) can determine the speed of the fan (3). The control unit also detects the motor's power consumption and compares this and the speed with a characteristic curve for the motor (2) for a given flow from the fan, which is stored in a memory (14). In the event of any deviation, the control unit (12) regulates a change of the voltage supply to the motor (2) so that the deviation is reduced.

12 Claims, 2 Drawing Sheets

U.S. PATENT DOCUMENTS

Figure 1:
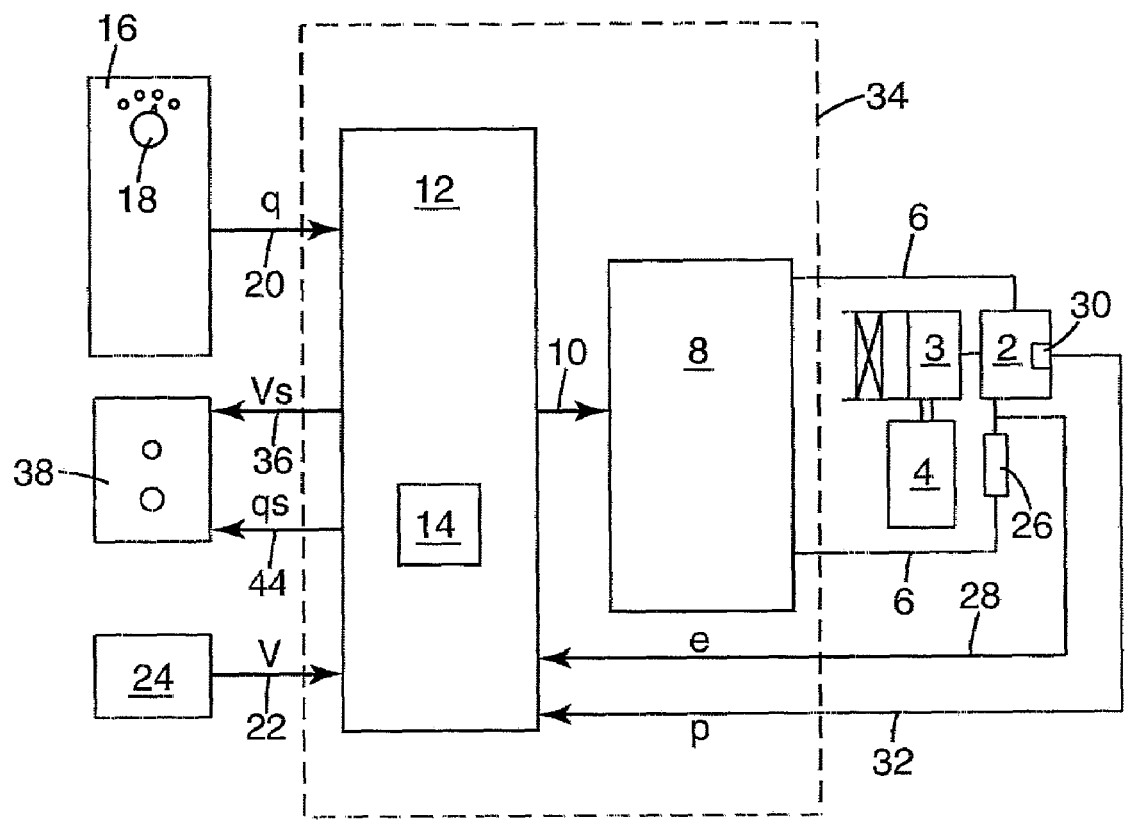

| | | | |
|---|---|---|---|
| 6,956,344 B2* | 10/2005 | Robertson et al. | 318/538 |
| 7,132,813 B2* | 11/2006 | Gregori et al. | 318/466 |
| 2001/0004197 A1* | 6/2001 | Kawabata et al. | 318/811 |
| 2002/0057069 A1* | 5/2002 | Kushida | 318/727 |
| 2003/0222608 A1* | 12/2003 | Vyssotski et al. | 318/254 |
| 2004/0052187 A1* | 3/2004 | Kim | 369/53.29 |
| 2005/0093500 A1* | 5/2005 | Robertson et al. | 318/538 |
| 2005/0095138 A1* | 5/2005 | Robertson et al. | 417/16 |
| 2005/0163615 A1* | 7/2005 | Chheda et al. | 416/31 |
| 2006/0214619 A1* | 9/2006 | Saito et al. | 318/446 |

FOREIGN PATENT DOCUMENTS

| | | |
|---|---|---|
| GB | 0518538 A2 * | 1/1992 |
| SU | 611031 | 7/1973 |
| SU | 424093 | 4/1974 |
| SU | 512454 | 4/1976 |
| SU | 1784498 A1 | 10/1990 |
| WO | 91/17491 | 11/1991 |

* cited by examiner

PROCESS AND DEVICE FOR FLOW CONTROL OF AN ELECTRICAL MOTOR FAN

This invention relates to controlling the flow from a fan which is powered by an electrical motor, and refers specifically to the maintenance of a constant flow from a fan having a filter positioned on the suction side of the fan.

It may be necessary to carry out certain types of work in an environment which is hazardous to health as a result of smoke or poisonous gases surrounding the person who has to carry out the work. Welding work is one example of this type of work. Ventilation units have been designed in order that such work can be carried out without any risks to health. These use an electric-powered fan to blow fresh air to a protective helmet which the person wears when carrying out such work. The unit can be equipped with a filter, for example on the suction side of the fan, to filter out particles and/or unwanted gases from the air which is to be inhaled. The unit can be portable and powered by batteries.

In order that it can be safe to use such a unit, a flow of fresh air must be able to be guaranteed, which does not fall below a certain level that is for example fixed as a health protection standard. This level must be maintained even if the filter becomes increasingly blocked the longer the unit is used. It is also desirable in order that it shall be comfortable to use the unit that the flow is not of such a volume/power that is causes discomfort in the form of draughts, and that the unit shall be able to be used for long periods, e.g. an entire working period, without the need for any manual adjustments or maintenance. With battery-powered units in particular it is desirable that the unit shall be able to work to a great degree independently of the battery voltage.

The invention is based on the knowledge that these requirements and wishes are able to be met if the flow can be kept constant at a set, predetermined level, and that known correlations can be utilized to regulate the flow. Each fan has a specific fan characteristic that describes the correlation between speed, flow and air output at different pressure drops. Thus the desired flow can be achieved at a certain pressure drop, or the flow can be kept constant by a change in pressure drop, by regulating the speed and/or air output. In addition, each fan has a certain efficiency level that gives a correlation between air output and shaft power. The output is the product of the number rotations and torque, which has a certain correlation to power consumption for each electric motor. This means that it is possible to draw a set of graphs for each fan/electric motor combination which each state a given flow for different pressure drops and a set of graphs which each state a given pressure drop for various flows. By measuring both the number of revolutions and power consumption for the electric motor it is possible to determine the actual flow, and if this does not correspond to the desired flow it can be regulated by for example varying the voltage that powers the motor.

The object of the invention is to bring about a flow regulation, the maintenance of a constant flow in particular, which is both reliable and economic.

According to the present invention this is achieved by means of a method and a configuration which demonstrate the stated characteristics in the independent patent claims.

Figure 2:
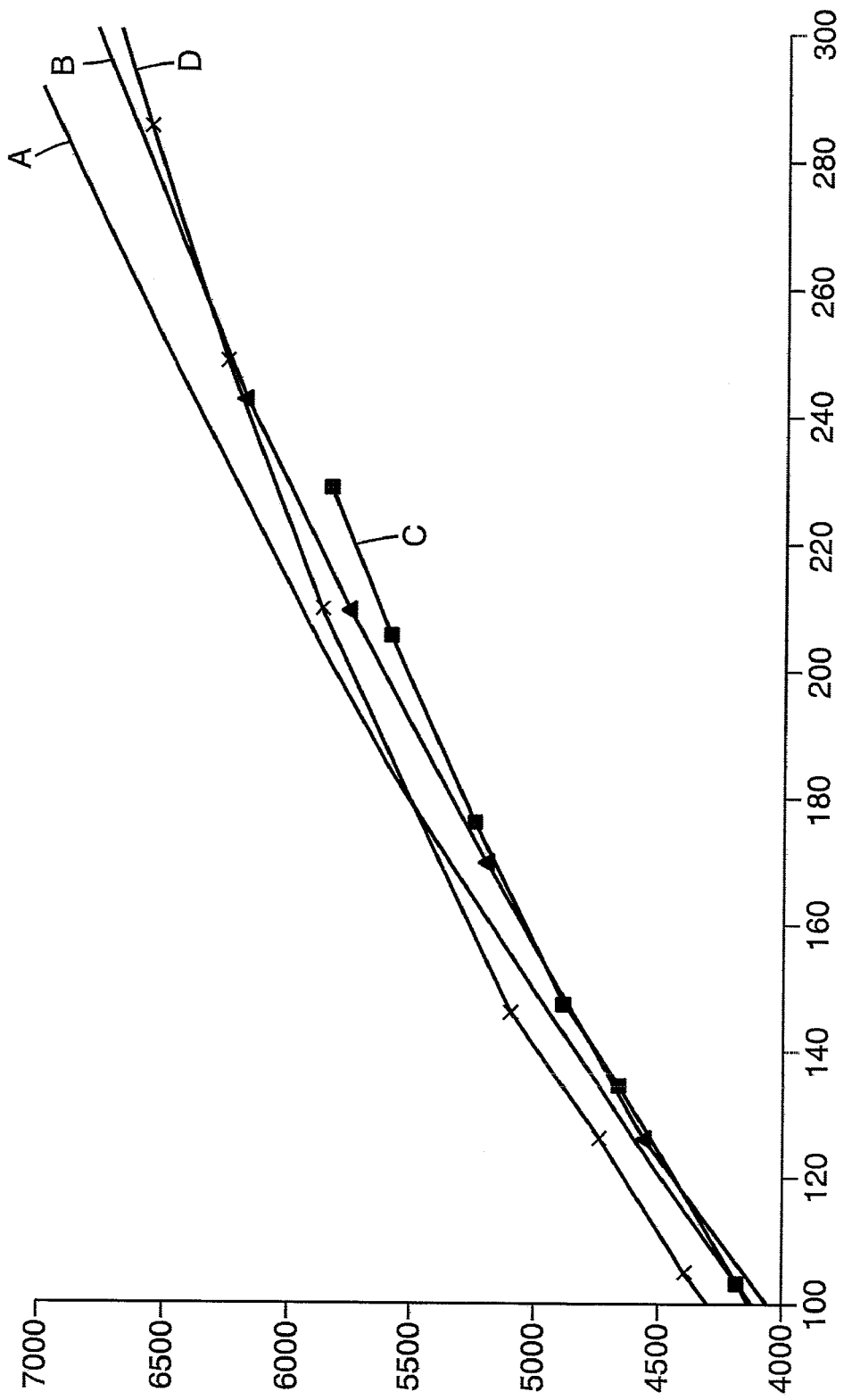

A example of the invention is described in more detail with reference to the attached diagram, in which FIG. 1 illustrates in block diagram format a regulating device for an electric-powered fan, and FIG. 2 illustrates a revolution/power consumption diagram for the electric motor.

A brushless direct current motor (2), preferably a three-phase bipolar motor, powers a radial fan (3) in a portable, fresh air unit for a welding helmet for welding which also functions as a respiratory protector. A filter (5), which can be a particle filter and/or a gas filter, is positioned on the suction side of the fan (3). The fresh air unit and the welding helmet can for example be designed according to existing technology and therefore are not shown or described here in detail.

The electric motor (2) is supplied with power via a cable (6) from a power control device (8). This is powered and regulated in turn via a cable (10) from a control unit (12). This contains a memory means (14) in which are stored revolution and power consumption values for the electric motor in the form of characteristic curves for predetermined flows at various pressure drops over the filter (5), or over different filters (5).

FIG. 2 is a diagram which shows four different correlations between speed and power consumption of the fan motor (2). Two curves A and B show the correlation at constant flows, 160 and 200 l/min respectively, and thus at varying restriction at the suction side. The two other curves, C and D, show the correlation at constant restriction and varying flows. Curve C, for example, illustrates the correlation using a clean filter and curve D shows the correlation for the same filter partly clogged, or for a thicker filter.

The fresh air unit has a control panel (16) on which the welder can set the desired flow of fresh air to the helmet with the aid of a flow selector dial (18). A signal (q) corresponding to this selected flow is sent via a cable (20) to the control unit (12). The control unit (12) receives supply voltage (V) via a cable (22) from a battery (24).

The power supply cable (6) contains a test resistor (26) connected in series with the electric motor (2). A signal (e) corresponding to the voltage drop over the resistor (26) is drawn at the end of the resistor connected to the motor (2) and supplied via a cable (28) to the control unit (12). The voltage drop is proportional to the power consumption of the motor and the control unit transforms the signal (e) into a digital current signal (1). The motor (2) also has a sensor (30), with the help of which the actual speed can be determined. In the example presented, the sensor consists of one or more Hall sensors for determining the position of the rotor. The position signal (p) emitted by the sensor (30) is supplied via a cable (32) to a control unit (12). Knowing the number of position indications per concentric rotation at the motor (2), the control unit (12) can convert the position signal (p) into a digital speed signal (n). The control device (34) comprising the control unit (12) and the power control device (8) may preferably be fully or partially fitted in the motor (2).

The controlling device functions as follows. Before beginning the actual work the welder fits a suitable filter (5) in the fresh air unit, e.g. a filter corresponding to curve C. The welder then sets the desired flow of fresh air to the welding helmet using the flow selector dial (18), for example 160 l/min. A signal (q), which denotes this flow, is sent via the cable (20) to the control unit (12), which selects corresponding curve A in the memory (14). The control unit (12) now compares the current and speed values received from the voltage signal (e) via the cable (28) and the position signal (p) via the cable (32) with the selected curve When both these values are to be found again in a point on the curve A, the fan is supplying the desired flow of air. If, however, only one of the values is on the curve and the other value is deviating from there, the fan is supplying too much or too little air flow, and the control unit can determine which of these it is by comparison. If, for example, the values for current and speed are 160 mA and 5300 rpm respectively, the speed will be above curve A, which states 5200 rpm for 160 mA. This indicates too little flow, e.g. because the filter is partially clogged. The values from the motor will correspond instead to curve D.

The motor power must thus be increased in order to increase the flow, which is why the control unit (12) gives a corresponding signal in the cable (10) to the power control device (8), which in turn increases the voltage in the supply cable (6) to the motor (2). Power consumption increases. The new current and speed values, which have been received from the new voltage and position signals (e and p respectively), are then compared with the selected flow curve A, and the regulating process is then repeated until both the values lie on the curve. This takes place at the intersectional point between curves A and D, at approx. 185 mA and 5600 rpm. The regulation will occur around this intersectional point and the flow will be maintained essentially constant at the set value. If for any reason the welder should wish to have another flow, e.g. an increased flow of 200 l/min for a certain period, he must set the flow selector dial (18) to the desired flow, whereupon the control unit (12) will select the corresponding curve, in this case curve B, controls, via the power control device (8), the motor (2) will control the fan (3) to this flow and maintain this at a constant level.

As is shown in the diagram in FIG. 2, the intersectional points between the curves are not well-defined at low speeds and power consumption. The lower curve C in particular winds about, which is because the filter has a low pressure drop as long as it is clean. The motor is then idling, at which time the power consumption corresponds largely to the motor's idling current and only is only affected to a lesser degree by the filter's resistance. In order that controlling action shall not end up in oscillation, minimum speed protection means are included in the control unit so that the speed is not permitted to drop below certain levels, which for example is set experimentally as well above idling speed. In the example shown, the speed for example was not permitted to drop below 4300 rpm at a flow of 160 l/min, and 4900 rpm at 200 l/min respectively.

The regulation of the power of the motor (2) is accomplished using pulse technology in order to maintain the dissipation effect as low as possible, which is essential in a battery powered unit. As a safety measure there is also a warning signal if the battery voltage is too low. For this purpose the control unit (12) detects the incoming battery voltage V. If this drops below a predetermined minimum level, the control unit (12) emits a warning signal Vs via a cable (36) to an alarm unit (38) in the fresh air unit. The warning signal lights an alarm light (40) in the alarm unit (38) in the form of a light emitting diode (LED) and activates an alarm buzzer (42) so that the welder is made aware that the unit cannot continue to function reliably.

The control unit has an additional safeguard. The memory (14) of the control unit (12) also has another curve which represents the minimum flow that meets the applicable protection standard. At regular intervals or continuously the control unit compares the actual values for the power consumption and speed of the motor (2) with this minimum flow curve. If the comparison shows that the actual flow is too little, the control unit (12) sends a warning signal (qs) in a cable (44) to the alarm unit (38) to activate the alarm light (40) and the alarm buzzer (42).

The invention claimed is:

1. A method for flow regulation at a fan (3) having a suction side, the fan powered by an electric motor (2), specifically for maintaining the flow from a fan at a constant level, said fan having a filter (5) positioned at the suction side of the fan, characterized in that values representing actual power consumption and speed of the motor (2) are determined, in that a pulse signal (p) is created in the motor (2), which pulse signal indicates the position of the motor's rotor, said pulse signal being converted into a speed indicating signal, a control unit (12) compares the values representing actual power consumption and speed of the motor with a curve or table stored in a memory (14), which indicates the correlation between power consumption and speed for a given flow from the fan, the control unit (12), if one of the values representing actual power consumption and speed of the motor lies at a point on the curve or in the table but another of the values representing actual power consumption and speed of the motor deviates from this point, determines whether the deviating value is too high or too low, the control unit (12) controls a change of the electrical power supplied to the motor to reduce the deviation, and that new ones of the values representing actual power consumption and speed of the motor are determined repetitively until there is no deviation of the values representing actual power consumption and speed of the motor.

2. The method according to claim 1, characterized in that a brushless direct current motor (2) is chosen as the motor.

3. The method according to claim 1, characterized in that a desired constant flow is set by selecting a curve corresponding to this from a plurality of curves (A, B) stored in the memory (14), each relating to a flow.

4. The method according to claim 1, characterized in that the control unit (12) compares the values for speed and power consumption with a minimum curve representing a predetermined minimum flow, and emits a warning signal (qs) if the value equate to a flow less than this minimum flow.

5. The method according to claim 1, characterized in that the control unit (12) compares the speed value with a minimum value for speed at various power consumption levels stored in the memory, and that regulation of the motor (2) is carried out so that the motor speed is prevented from dropping below the minimum value which corresponds to the current value for power consumption.

6. A configuration for flow control of a fan (3), which is powered by an electric motor (2), specifically for maintenance of a constant flow from a fan having a rotor and a filter (4) positioned on a suction side of the fan, characterized in that a control unit (12) is connected to the motor, the control unit controls the voltage supply to the electric motor; a first sensor (26) is connected to the control unit (12), with the aid of which the actual value of the motor's power consumption is determined; a second sensor (30) comprised in the motor to indicate the position of the rotor, with the aid of which the motort's actual speed is determined; a memory (14) in which at least one curve (A, B) or a table is stored, which states the correlation between the speed and power consumption of the motor (2) at a given flow at the fan (3); and a comparison means in the control unit set to compare both the motor's actual speed and the motor's power consumption with a selected flow curve from the memory and in the event of any deviation of the motor's actual speed and the motor's power consumption to control the voltage supply to the motor so that the deviation is reduced.

7. The configuration according to claim 6, characterized in that the motor is a brushless direct current motor (2).

8. The configuration according to claim 7, characterized in that the second sensor comprises a Hall sensor.

9. The configuration according to claim 6, characterized in that the fan is a radial fan (3).

10. The configuration according to claim 6, characterized in that the fan (3) is part of a fresh air unit for a respiratory aid.

11. The configuration according to claim 6, characterized in that the control unit (12) controls a warning means (40, 42) fitted in an alarm unit (38), for indicating if the flow from the fan (3) drops below a predetermined minimum level.

12. A flow control for a fan, said fan being powered by an electric motor having a rotor, comprising:
- a control unit operatively coupled to said electric motor, said control unit controlling a voltage supply to said motor;
- a first sensor sensing a parameter from which a power consumption of said electric motor is determined;
- a second sensor sensing a parameter indicative of a position of said rotor from which an actual speed of said electric motor is determined;
- a memory in which is stored values representative of a correlation between said actual speed of said electric motor and said power consumption of said motor at a given flow rate at said fan; and
- a comparator operatively coupled to said memory for comparing said power consumption and said actual speed of said electric motor with said stored values from said memory representative of a selected flow rate;

said control unit operative to control said voltage supply to said motor to reduce any deviation between said power consumption and said actual speed and said stored values from said memory representative of said selected flow rate.

* * * * *